(12) United States Patent
Sullivan et al.

(10) Patent No.: US 6,786,838 B2
(45) Date of Patent: Sep. 7, 2004

(54) GOLF BALL WITH MULTI-LAYERED CORE

(75) Inventors: Michael J. Sullivan, Barrington, RI (US); Derek A. Ladd, Fairhaven, MA (US); Antonio U. DeSimas, East Providence, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/373,938

(22) Filed: Feb. 25, 2003

(65) Prior Publication Data

US 2003/0148827 A1 Aug. 7, 2003

Related U.S. Application Data

(63) Continuation-in-part of application No. 10/002,641, filed on Nov. 28, 2001, now Pat. No. 6,547,677, which is a continuation-in-part of application No. 09/948,692, filed on Sep. 10, 2001, which is a continuation-in-part of application No. 09/172,608, filed on Oct. 18, 1998, now Pat. No. 6,302,808, which is a division of application No. 08/943,932, filed on Oct. 3, 1997, now Pat. No. 6,056,842, which is a continuation-in-part of application No. 08/996,718, filed on Dec. 23, 1997, now Pat. No. 6,124,389, which is a continuation-in-part of application No. 08/746,362, filed on Nov. 8, 1996, now Pat. No. 5,810,678, which is a continuation-in-part of application No. 08/706,008, filed on Aug. 30, 1996, now Pat. No. 5,813,923, which is a continuation-in-part of application No. 08/603,057, filed on Feb. 16, 1996, now Pat. No. 5,759,676, which is a continuation-in-part of application No. 08/482,522, filed on Jun. 7, 1995, now Pat. No. 5,688,191, which is a continuation-in-part of application No. 09/630,387, filed on Aug. 1, 2000, now Pat. No. 6,458,892, which is a continuation-in-part of application No. 08/603,057, which is a continuation-in-part of application No. 09/815,753, filed on Mar. 23, 2001, now Pat. No. 6,494,795.

(51) Int. Cl.$^7$ ............................ A63B 37/04; A63B 37/06

(52) U.S. Cl. ........................................ 473/373; 473/376

(58) Field of Search ................................ 473/351–378

(56) References Cited

U.S. PATENT DOCUMENTS

| | | | |
|---|---|---|---|
| 4,508,309 A | 4/1985 | Brown | 249/81 |
| 4,625,964 A | 12/1986 | Yamada | |
| 4,714,253 A | 12/1987 | Nakahara et al. | 473/373 |
| 4,848,770 A | 7/1989 | Shama | 473/373 |
| 4,863,167 A | 9/1989 | Matsuki et al. | |
| 5,048,126 A | 9/1991 | McLaughlin | 2/125 |
| 5,048,838 A | 9/1991 | Chikaraishi et al. | 473/373 |
| 5,104,126 A | 4/1992 | Gentiluomo | |
| 5,184,828 A | 2/1993 | Kim et al. | |
| 5,252,652 A | * 10/1993 | Egashira et al. | 524/392 |
| 5,334,673 A | 8/1994 | Wu | |

(List continued on next page.)

OTHER PUBLICATIONS

Farrally, M.R. et al., Science and Golf III: Proceedings of the World Scientific Congress of Golf. Illinois: Human Kinetics, copyright 1999, p. 411.

Primary Examiner—Stephen P. Garbe
Assistant Examiner—Alvin A. Hunter, Jr.

(57) ABSTRACT

A golf ball having a multi-layered core comprising at least three core layers and a dimpled cover is disclosed. The core may have three layers, A, B and C, four layers, A, B, C and D, five layers, A, B, C, D and E or up to six layers, A, B, C, D, E and F. In accordance to the present invention, the radius or thickness of each core layer is at least twice as much as the adjacent outer core layer. One outer core layer can be a water vapor barrier layer to protect the ball from water vapor encroachment, which reduces the performance of the ball. Another outer core layer can be a thin dense layer with high specific gravity to increase the rotational moment of inertia to reduce the spin of the ball during flight. Another outer core layer can be a perforated spherical shell to increase the resilience and/or coefficient of restitution of the ball. Another outer core layer could be a cushioning layer to act as a shock absorber. The core layers may also have increasing or decreasing hardness.

16 Claims, 1 Drawing Sheet

U.S. PATENT DOCUMENTS

| | | | | |
|---|---|---|---|---|
| 5,439,227 A | | 8/1995 | Egashira et al. | 473/373 |
| 5,482,285 A | | 1/1996 | Yabuki et al. | |
| 5,674,137 A | * | 10/1997 | Maruko et al. | 473/354 |
| 5,688,595 A | * | 11/1997 | Yamagishi et al. | 428/375 |
| 5,725,442 A | * | 3/1998 | Higuchi et al. | 473/376 |
| 5,730,665 A | * | 3/1998 | Shimosaka et al. | 473/376 |
| 5,733,205 A | * | 3/1998 | Higuchi et al. | 473/376 |
| 5,743,816 A | | 4/1998 | Ohsumi et al. | 473/376 |
| 5,762,568 A | * | 6/1998 | Kato | 473/365 |
| 5,772,531 A | | 6/1998 | Ohsumi et al. | 473/376 |
| 5,779,562 A | | 7/1998 | Melvin et al. | 473/373 |
| 5,779,563 A | | 7/1998 | Yamagishi et al. | 473/371 |
| 5,810,678 A | | 9/1998 | Cavallaro et al. | 473/373 |
| 5,824,746 A | | 10/1998 | Harris et al. | 525/196 |
| 5,908,358 A | | 6/1999 | Wu | 473/378 |
| 5,919,100 A | | 7/1999 | Boehm et al. | 473/354 |
| 5,929,171 A | * | 7/1999 | Sano et al. | 525/261 |
| 5,929,189 A | | 7/1999 | Ichikawa et al. | 528/76 |
| 5,947,842 A | | 9/1999 | Cavallaro et al. | 473/373 |
| 5,971,870 A | | 10/1999 | Sullivan et al. | 473/373 |
| 6,025,442 A | | 2/2000 | Harris et al. | 525/221 |
| 6,045,460 A | * | 4/2000 | Hayashi et al. | 473/376 |
| 6,056,650 A | * | 5/2000 | Yamagishi et al. | 473/384 |
| 6,057,403 A | | 5/2000 | Sullivan et al. | 525/221 |
| 6,117,024 A | | 9/2000 | Dewanjee | 473/351 |
| 6,117,026 A | * | 9/2000 | Hayashi et al. | 473/374 |
| 6,120,393 A | | 9/2000 | Sullivan et al. | 473/377 |
| 6,123,630 A | * | 9/2000 | Hayashi et al. | 473/376 |
| 6,124,389 A | | 9/2000 | Cavallaro et al. | 473/373 |
| 6,135,899 A | * | 10/2000 | Maruko | 473/376 |
| 6,142,887 A | | 11/2000 | Sullivan et al. | 473/374 |
| 6,210,294 B1 | | 4/2001 | Wu | 473/378 |
| 6,213,895 B1 | | 4/2001 | Sullivan et al. | 473/374 |
| 6,245,859 B1 | | 6/2001 | Sullivan et al. | 525/330.2 |
| 6,299,550 B1 | | 10/2001 | Molitor et al. | 473/354 |
| 6,302,808 B1 | | 10/2001 | Dalton et al. | 473/371 |
| 6,309,313 B1 | | 10/2001 | Peter | 473/378 |
| 6,336,872 B1 | | 1/2002 | Moriyama et al. | 473/374 |
| 6,361,454 B1 | | 3/2002 | Yoshida et al. | 473/376 |
| 6,379,269 B1 | | 4/2002 | Nesbitt et al. | 473/371 |
| 6,394,913 B1 | | 5/2002 | Nesbitt et al. | 473/351 |
| 6,394,914 B1 | | 5/2002 | Sullivan | 473/376 |
| 6,425,833 B1 | | 7/2002 | Sullivan et al. | 473/373 |
| 2002/0019268 A1 | | 2/2002 | Tsunoda et al. | 473/351 |

* cited by examiner

GOLF BALL WITH MULTI-LAYERED CORE

CROSS REFERENCE TO RELATED APPLICATIONS

This application is a continuation-in-part of parent U.S. patent application Ser. No. 10/002,641, entitled "Multi-layered Core Golf Ball," filed on Nov. 28, 2001, now U.S. Pat. No. 6,547,677 the disclosure of which is hereby incorporated by reference in its entirety.

The parent application is a continuation-in-part of U.S. patent application Ser. No. 09/948,692, filed Sep. 10, 2001 now U.S. Pat. No. 6,547,677, which is a continuation-in-part of U.S. patent application Ser. No. 09/172,608, filed Oct. 18, 1998, now U.S. Pat. No. 6,302,808, which is a division of U.S. patent application Ser. No. 08/943,932, filed Oct. 3, 1997, now U.S. Pat. No. 6,056,842, also a continuation-in-part of U.S. application Ser. No. 08/996,718, filed Dec. 23, 1997, now U.S. Pat. No. 6,124,389, which is a continuation-in-part of U.S. application Ser. No. 08/746,362, filed Nov. 8, 1996, now U.S. Pat. No 5,810,678, which is a continuation-in-part of U.S. patent application Ser. No. 08/706,008, filed Aug. 30, 1996, now U.S. Pat. No. 5,813,923, which is a continuation-in-part of U.S. patent application Ser. No. 08/603,057, filed Feb. 16, 1996, now U.S. Pat. No. 5,759,676, which is a continuation-in-part of U.S. patent application Ser. No. 08/482,522, filed Jun. 7, 1995, now U.S. Pat. No. 5,688,191 also a continuation-in-part of U.S. patent application Ser. No. 09/630,387, filed Aug. 1, 2000, which is a continuation-in-part of U.S. patent application Ser. No. 08/603,057, filed Feb. 16, 1996, now U.S. Pat. No. 5,759,676; also the application is a continuation-in-part of U.S. patent application Ser. No. 09/815,753, filed Mar. 23, 2001, now U.S. Pat. No. 6,494,795 the disclosures of which are hereby incorporated by reference in their entirety.

FIELD OF THE INVENTION

This invention generally relates to multi-layered golf balls, and more particularly the invention relates to golf balls having a core with at least three layers.

BACKGROUND OF THE INVENTION

Generally, golf balls have been classified as wound balls or solid balls. Wound balls are generally constructed from a liquid or solid center surrounded by tensioned elastomeric material. Wound balls are performance golf balls, and have a good resiliency, spin characteristics and feel when struck by a golf club. However, wound balls are generally more difficult to manufacture than solid golf balls.

Early solid golf balls were generally two piece balls, i.e., comprising a core and a cover. The primary purpose of the core is to be the "spring" of the ball or the principal source of resiliency. The cover protects the core and improves the spin characteristics of the ball. More recently developed solid balls comprise a core, a mantle layer and a cover to improve the playing characteristics of the balls.

Solid balls are typically made with a single-solid core, usually made of a cross-linked polybutadiene or other rubber, which is encased by a cover. These balls are typically the least expensive to manufacture as the number of components is low and these components can be manufactured by relatively quick, automated molding techniques.

The prior art also discloses golf balls that have been designed to provide particular playing characteristics. These characteristics include the initial velocity and spin of the golf ball, which can be optimized for various types of players. For instance, certain players prefer a ball that has a high spin rate in order to control and stop the golf ball. Other players prefer a ball that has a low spin rate and high resiliency to maximize distance. Generally, a golf ball having a hard core and a soft cover will have a high spin rate. Conversely, a golf ball having a hard cover and a soft core will have a low spin rate. Golf balls having a hard core and a hard cover generally have very high resiliency for distance, but have a hard feel and are difficult to control around the greens.

The prior art also discloses golf balls with multi-layered core, such as U.S. patent application Ser. No. 2002/0019268, which discloses a six-layer core with an inner core layer having a low modulus of elasticity and an outer core layer having a high modulus of elasticity. Golf balls with two-layer core are also known, such as U.S. Pat. No. 6,245,859 B1, 6,213,895 B1 and 6,057,403, among others. Similarly, golf balls with three-layer core are disclosed in U.S. Pat. Nos. 5,772,531 and 5,743,816. However, none of these references discloses multi-layered golf ball core with predetermined thickness ratio among all the core layers.

SUMMARY OF THE INVENTION

The invention is directed to a golf ball comprising a core and a cover, wherein the core comprises at least three layers and wherein the radius and the thickness (T) of the core layers follow the equation $T_A \geq 2T_B \geq 4T_C$, wherein $T_A$ is the radius of the inner most core, $T_B$ is the thickness of the adjacent outer core layer and $T_C$ is the thickness of the next adjacent outer core layer.

The golf ball may further comprises a fourth core layer, and the radius and thickness (T) of the core layers follow the equation $T_A \geq 2T_B \geq 4T_C \geq 8T_D$, wherein $T_D$ is the thickness of the next adjacent outer core layer. The golf ball may further have a fifth core layer, and the radius and thickness (T) of the core layers follow the equation $T_A \geq 2T_B \geq 4T_C \geq 8T_D \geq 16T_E$, wherein $T_E$ is the thickness of the next adjacent outer core layer. Additionally, the golf ball may further comprises a sixth core layer, and the radius and thickness (T) of the core layers follow the equation $T_A \geq 2T_B \geq 4T_C \geq 8T_D \geq 16T_E \geq 32T_F$, wherein $T_F$ is the thickness of the next adjacent outer core layer.

In accordance with another aspect of the present invention, one of the core layers can be a water vapor barrier layer, and the water vapor barrier layer can be a compressed exfoliated graphite layer. Additionally, one of the core layers can be a thin dense layer, and/or a perforated spherical shell. One of the core layers may be capable of absorbing shock, and/or comprises substantially no fillers. One of the core layers may be foamed.

In accordance with another aspect of the present invention, the core layers have progressively decreasing hardness from the innermost core layer toward the outermost layer, and wherein the hardness of the innermost core layer is at least 15 points on the Shore D scale higher than the hardness of one of the outer core layers. Alternatively, the core layers have progressively increasing hardness from the innermost core layer toward the outermost layer and wherein the hardness of the innermost core layer is at least 15 points on the Shore D scale lower than the hardness of one of the outer core layers.

At least one core layer comprises polybutadiene, a crosslinking agent, a co-crosslinking agent, and a cis-to-trans catalyst, and the cis-to-trans catalyst is preferably a halogenated organo-sulfur compound.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
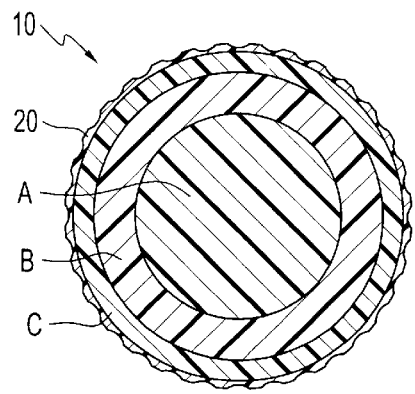
FIG. 1 is a cross-sectional view of a multi-layered golf ball having a three-layer core in accordance with the present invention.
Figure 2:
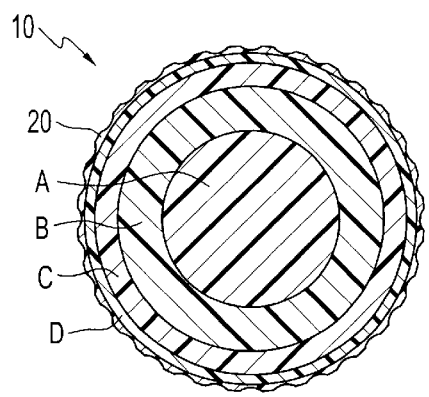
FIG. 2 is a cross-sectional view of a multi-layered golf ball having a four-layer core in accordance with the present invention.
Figure 3:
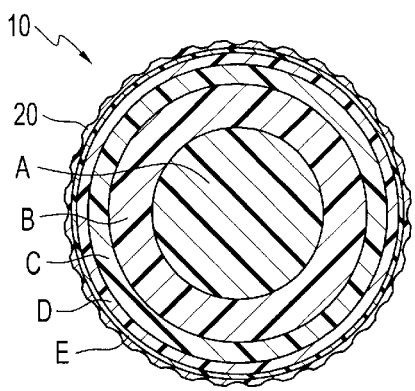
FIG. 3 is a cross-sectional view of a multi-layered golf ball having a five-layer core in accordance with the present invention.
Figure 4:
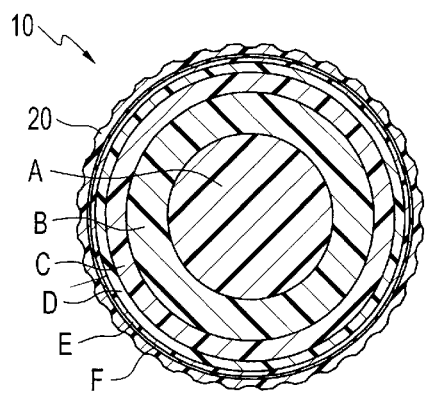
FIG. 4 is a cross-sectional view of a multi-layered golf ball having a six-layer core in accordance with the present invention.

Referring to FIGS. 1–4, golf ball 10 includes a multi-layered core comprising at least three core layers and a dimpled cover 20. The core may have three layers, A, B and C, four layers, A, B, C and D, five layers, A, B, C, D and E or up to six layers, A, B, C, D, E and F. In accordance with the present invention, the radius or thickness of each core layer is at least twice as much as the adjacent outer core layer. In other words, the core layers are progressively thinner by at least a factor of ½ in the direction from the center of the ball toward the cover. Hence if T designates the radius of the innermost core layer or the thickness of other core layers, then the following equations govern the geometrical relationship between the core layers for three-, four-, five- and six-layer cores, respectively:

$$T_A \geq 2T_B \geq 4T_C$$

$$T_A \geq 2T_B \geq 4T_C \geq 8T_D$$

$$T_A \geq 2T_B \geq 4T_C \geq 8T_D \geq 16T_E$$

$$T_A \geq 2T_B \geq 4T_C \geq 8T_D \geq 16T_E \geq 32T_F.$$

The non-limiting examples shown in the Table below illustrate the dimensional relationship among the multiple core layers shown in FIGS. 1–4. Preferably, the radius of the innermost core A ranges from about 0.40 inch to about 0.50 inch, which corresponds to diameter in the range of about 0.80 inch to about 1.0 inch. The diameter of innermost core A can be as high as 1.40 inch or higher, so long as the above equations are followed.

|  | Three-layer Core | Four-layer Core | Five-layer Core | Six-layer Core |
| --- | --- | --- | --- | --- |
| A (radius) | 0.500 | 0.425 | 0.415 | 0.400 |
| B (thickness) | 0.200 | 0.212 | 0.208 | 0.200 |
| C (thickness) | 0.100 | 0.106 | 0.104 | 0.100 |
| D (thickness) |  | 0.052 | 0.052 | 0.050 |
| E (thickness) |  |  | 0.026 | 0.025 |
| F (thickness) |  |  |  | 0.013 |
| Diameter of Core | 1.600 | 1.590 | 1.608 | 1.575 |
| Cover (thickness) | 0.040 | 0.045 | 0.035 | 0.050 |
| Diameter of Ball | 1.680 | 1.680 | 1.678 | 1.675 |

In accordance with one aspect of the present invention, the thinner outer core layers, e.g., layers C, D, E and F and more preferably layers D, E and F, can be designed to provide specific properties to the ball. More specifically, one outer core layer can be a water vapor barrier layer to protect the ball from water vapor encroachment, which reduces the performance of the ball. Another outer core layer can be a thin dense layer with high specific gravity to increase the rotational moment of inertia to reduce the spin of the ball during flight. Another outer core layer can be a perforated spherical shell to increase the resilience and/or coefficient of restitution of the ball. Another outer core layer could be a cushioning layer to act as a shock absorber.

Water vapor barrier layer resists the encroachment of water vapor into the inner core. Polybutadiene, the most commonly used polymer in golf ball cores, when cross-linked with peroxide and/or zinc diacrylate is susceptible to have its resilience degraded by encroaching water vapor. The water vapor barrier layer preferably has a moisture vapor transmission rate lower than that of the cover, and may include nano particles, flaked-metals, such as mica, iron oxide and aluminum, or ceramic particles disposed therein. Water vapor barrier layer is fully disclosed in commonly owned U.S. patent application Ser. No. 09/973,842 entitled "Golf Ball with Moisture Vapor Barrier Layer," filed on Oct. 9, 2001. Additionally, the water vapor barrier layer can be made from extremely thin layer of compressed exfoliated graphite having a thickness in the range of 0.1 micron to about 600 microns. Compressed exfoliated graphite has been shown to be impermeable to helium at a pressure of $10^{-5}$ mm of mercury, which essentially is a vacuum. Compressed exfoliated graphite layer is fully disclosed in commonly owned U.S. patent application Ser. No. 10/157,521 entitled "Golf Ball Containing Graphite Nanosheets in a Polymeric Network," filed on May 29, 2002. The '842 and '521 patent applications are incorporated herein by reference.

Thin dense layer has high specific gravity to increase the rotational moment of inertia, which would reduce the spin of the ball. Recreational players, who cannot intentionally control the spin of the ball, prefer a ball with low spin. These balls tend to drift less drastically when they are not hit squarely off the club face. The thin dense layer can have a thickness in the range of about 0.001 inch to about 0.050 inch, more preferably from about 0.005 inch to about 0.030 inch, and most preferably from about 0.010 inch to about 0.020 inch. The thin dense layer preferably has a specific gravity of greater than about 1.2, more preferably greater than 1.5 and most preferably greater than 2.0. Thin dense layer is fully discussed in commonly owned U.S. Pat. No. 6,494,795 B2. The '795 patent is incorporated herein by reference.

Perforated spherical shell can be a non-continuous layer, a screen or a lattice. The perforated shell may also have high specific gravity. Preferably, the perforated shell is made from a durable material such as metal, flexible or rigid plastics, high strength organic or inorganic fibers, materials having high Young's modulus. The perforated spherical shell, specifically in the form of geodesic or pohyhedron screens, has an inherent spring-like property that allows the shell to deform when the ball is struck and to spring back to its original shape after impact. Perforated spherical shell is fully disclosed in commonly owned patent application Ser. No. 10/082,577, entitled "Golf Ball Having a High Moment of Inertia and Low Driver Spin Rate," filed on Jun. 6, 2002. The '577 patent application is incorporated herein by reference.

Cushioning layer improves the durability and softness of the ball upon impact. Preferably, the cushioning layer is made from a responsive viscoelastic composition, including solids, semi-solids, gels, or gel-like materials that have a rheopetic, dilatant, or thixotropic viscosity that exhibit an increase in viscosity in response to shear stress, tensile stress, compressive stress or a combination thereof. Cushioning layer is fully disclosed in commonly owned U.S. patent application Ser. No. 09/767,723, entitled "Multi-layer Golf Ball," filed on Jan. 24, 2001. The disclosure of the '723 patent application is incorporated herein by reference.

In accordance with another aspect of the present invention, the inner core layers, e.g., layers A, B, and C, would occupy sufficient volume of the ball to serve as the "spring" of the ball, as discussed above. In accordance with another aspect of the present invention at least one of the inner three core layers comprises substantially no filler to increase the resilience and coefficient of restitution of the ball. As used herein, substantially no filler indicates less than about 5 parts of fillers to 100 parts of polymeric material. Preferably, inner core A contains all of the fillers and core layers B and C are substantially free of fillers to increase the coefficient of restitution of the ball. This feature is disclosed in commonly owned U.S. patent application Ser. No. 10/157,679, entitled "Golf Ball," filed on May 29, 2002. The '679 patent is incorporated herein by reference.

Alternatively, at least one of inner core layers A, B and C is foamed to reduce the specific gravity, so that one of the outer core layers D, E and F may have high specific gravity to produce a high rotational moment of inertia ball.

In accordance with another aspect of the present invention, core layers A, B and C each has a different hardness. In one embodiment, the hardness of layer A is higher than the hardness of layer B, and the hardness of layer B is higher than the hardness of layer C. Preferably, the hardness of the innermost core layer is at least 15 points on the Shore D scale higher than the hardness of one of the outer core layers. The progressively softer arrangement provides a golf ball with high spin. Alternatively, the hardness of layer A is lower than the hardness of layer B, and the hardness of layer B is lower than the hardness of layer C. Preferably, the hardness of the innermost core layer is at least 15 points on the Shore D scale lower than the hardness of one of the outer core layers. The progressively softer arrangement provides a golf ball with low spin.

Preferably, each core layer is different from each other utilizing the different properties disclosed above.

Preferably, the outer core layers, e.g., C, D, E and F, are formed as a laminate that can be molded around the inner core layers. Exemplary methods of constructing golf ball 10 of the present invention are fully disclosed in the parent '641 patent application, which has already been incorporated by reference.

Preferably, the core layers comprise a resilient polymer such as polybutadiene, natural rubber, polyisoprene, styrene-butadiene, ethylene-propylene-diene rubber, highly neutralized polymers, or a combination thereof. More preferably, the core layers comprise polybutadiene, a crosslinking agent, a co-crosslinking agent, and a cis-to-trans catalyst such as halogenated organo-sulfur compound.

Other suitable polymeric core materials include thermoset plastics, such as natural rubber, other grades of polybutadiene, polyisoprene, styrene-butadiene or styrene-propylene-diene rubber, and thermoplastics such as ionomer resins, polyamides, polyesters, or a thermoplastic elastomer. Suitable thermoplastic elastomers include Pebax®, which is believed to comprise polyether amide copolymers, Hytrel®, which is believed to comprise polyether ester copolymers, thermoplastic urethane, and Kraton®, which is believed to comprise styrenic block copolymers elastomers. These products are commercially available from Elf-Atochem, E. I. Du Pont de Nemours and Company, various manufacturers, and Shell Chemical Company, respectively. The inner core materials can also be formed from a metal salt of a fatty acid, any partially or fully neutralized ionomer, a metallocene or other catalyzed polymer and a castable material. Suitable castable materials include those comprising a urethane, polyurea, epoxy, silicone, IPN's, etc.

Additionally, other suitable core materials are disclosed in U.S. Pat. No. 5,919,100 and international publications WO 00/23519 and WO 01/29129. These disclosures are incorporated by reference. One particularly suitable material disclosed in WO/29129 is a melt processible composition comprising a highly neutralized ethylene copolymer and one or more aliphatic, mono-functional organic acids having fewer than 36 carbon atoms of salts thereof, wherein greater than 90% of all the acid of the ethylene copolymer is neutralized.

In accordance to another aspect of the invention, the halogenated organo-sulfur compounds include organic compounds wherein at least one sulfur compound is added to the material that makes up the core to further increase the resiliency and the coefficient of restitution of the ball. Preferred sulfur compounds include, but are not limited to, pentachlorothiophenol (PCTP) and a salt of PCTP. A preferred salt of PCTP is ZnPCTP. The utilization of PCTP and ZnPCTP in golf ball inner cores to produce soft and fast inner cores is disclosed in co-pending U.S. application Ser. No. 09/951,963 filed on Sep. 13, 2001, and is assigned to the same assignee as the present invention. This co-pending application is incorporated by reference. A suitable PCTP is sold by the Structol Company under the tradename A95. ZnPCTP is commercially available from EchinaChem.

Crosslinkers and co-crosslinkers crosslink the polymeric material or materials used to form the core. Crosslinkers and co-crosslinkers used in the present invention include those commonly known to the ordinary skilled artisan. The skilled artisan can easily determine with little or no experimentation the amount of crosslinker and/or co-crosslinker necessary to achieve the desired polymeric material having the properties described above. Preferably, the crosslinking agents include metal salts of an alpha, beta-unsaturated carboxylic acid, preferably zinc diacrylate. The materials described above may be combined with other components, such as other polymers or copolymers, however not fillers, as known by one of ordinary skill in the art. The base composition can be mixed and formed using conventional techniques to produce the core.

Free radical initiators are used to promote cross-linking of the polymeric materials, in particular metal salt diacrylate, dimethacrylate, or monomethacrylate and the polybutadiene. Suitable free radical initiators for use in the invention include, but are not limited to peroxide compounds, such as dicumyl peroxide, 1,1-di(t-butylperoxy) 3,3,5-trimethyl cyclohexane, a--a bis(t-butylperoxy)diisopropylbenzene, 2,5-dimethyl-2,5di(t-butylperoxy)hexane, or di-t-butyl peroxide, and mixtures thereof. Other useful initiators would be readily apparent to one of ordinary skill in the art without any need for experimentation. The initiator(s) at about 40% to about 100% activity are preferably added in an amount ranging between about 0.05 pph and about 5 pph based upon 100 parts of polybutadiene, or polybutadiene mixed with one or more other elastomers. More preferably, the amount of initiator added ranges between about 0.15 pph to about 2 pph and most preferably between about 0.25 pph to about 1.5 pph. Suitable commercially available dicumyl peroxides include Perkadox BC, which is a 90% active dicumyl peroxide, and DCP 70, which is a 70% active dicumyl peroxide.

Cover 20 may comprise an inner cover and a dimpled outer cover. Preferably inner cover is made preferably from thermoplastic materials as described below. Suitable thermoplastic materials for the inner cover include polyethylene, polystyrene, polypropylene, thermoplastic polyesters, acetal, polyamides including semicrystalline polyamide, polycarbonate (PC), shape memory polymers, polyvinyl chloride (PVC), trans-polybutadiene, liquid crystalline polymers, polyether ketone (PEEK), bio(maleimide), and polysulfone resins. Other preferred thermoplastics for forming the inner cover include other Surlyn® from DuPont and, single-site catalyzed polymers including non-metallocene and metallocene, polyurethane, polyurea, or a combination of the foregoing. Suitable polymeric materials also include those listed in U.S. Pat. Nos. 6,187,864, 6,232,400, 6,245,862, 6,290,611 and 6,142,887 and in PCT publication No. WO 01/29129, which are incorporated herein by reference. Suitable materials are also disclosed in an U.S. patent application entitled "Golf Ball with Vapor Barrier Layer," bearing application Ser. No. 10/077,081, filed on Feb. 15, 2002, which is incorporated by reference.

The inner cover is preferably applied to the inner core as a liquid solution, dispersion, lacquer, paste, gel, melt, etc., such as a loaded or filled natural or non-natural rubber latex, polyurethane, polyurea, epoxy, polyester, any reactive or non-reactive coating or casting material, and then cured, dried or evaporated down to the equilibrium solids level. The inner cover may also be formed by compression or injection molding, RIM, casting, spraying, dipping, powder coating, or any means of depositing materials onto the inner core. The inner cover may also be a thermoplastic polymer loaded with a specific gravity increasing filler, fiber, flake or particulate, such that it can be applied as a thin coating and meets the preferred specific gravity levels discussed above.

For reactive liquid systems, the suitable materials include any material which reacts to form a solid such as epoxies, styrenated polyesters, polyurethanes or polyureas, liquid PBR's, silicones, silicate gels, agar gels, etc. Casting, RIM, dipping and spraying are the preferred methods of applying a reactive inner cover. Non-reactive materials include any combination of a polymer either in melt or flowable form, powder, dissolved or dispersed in a volatile solvent. Suitable thermoplastics are disclosed in U.S. Pat. Nos. 6,149,535 and 6,152,834.

The outer cover layer is preferably formed from a relatively soft thermoset material in order to replicate the soft feel and high spin play characteristics of a balata ball when the balls of the present invention are used for pitch and other "short game" shots. In particular, the outer cover layer should have a Shore D hardness of from less than about 65 or about 30 to about 60, preferably about 35 to about 50 and most preferably about 40 to about 45. Hardness is preferably measured pursuant to ASTM D-2240-02a (entitled "Standard Test Method for Rubber Property-Durometer Hardness") in either button or slab form. Additionally, the materials of the outer cover layer should have a degree of abrasion resistance in order to be suitable for use as a golf ball cover.

The outer cover can also be made of materials commonly known to the skilled artisan. The materials may include polymers known to the skilled artisan. Preferably, the material includes polyurethane, polyurea, or a combination thereof. Outer cover layer is preferably formed with a plurality of dimples or surface protrusions defined on the outer surface thereof. The polymer forming the outer cover layer may include fillers embedded in a polymeric matrix or binder material.

Conventionally, thermoset polyurethanes are prepared using a diisocyanate, such as 2,4-toluene diisocyanate (TDI) or methylenebis-(4-cyclohexyl isocyanate) (HMDI) and a polyol which is cured with a polyamine, such as methylenedianiline (MDA), or a trifunctional glycol, such as trimethylol propane, or tetrafunctional glycol, such as N,N,N', N'-tetrakis(2-hydroxypropyl)ethylenediamine. However, the present invention is not limited to just these specific types of thermoset polyurethanes. Quite to the contrary, any suitable thermoset polyurethane may be employed to form the outer cover layer of the present invention.

Alternatively, the inner cover layer may be omitted and cover 20 is a single-layer cover, which is made from the materials described in connection to the outer cover layer above.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A golf ball comprising a core and a cover, wherein the core comprises at least three layers having a thickness and radius, at least one of the core layers being a water vapor barrier layer, and wherein the radius and the thickness (T) of the core layers follow the equation $T_A \geq 2T_B \geq 4T_C$, wherein $T_A$ is the radius of the inner most core, $T_B$ is the thickness of the adjacent outer core layer and $T_C$ is the thickness of the next adjacent outer core layer and wherein the water vapor barrier layer has a thickness of about 0.001 to about 0.010 inches.

2. The golf ball of claim 1 further comprising a fourth core layer and wherein the radius and the thickness (T) of the core layers follow the equation $T_A \geq 2T_B \geq 4T_C \geq 8T_D$, wherein $T_D$ is the thickness of the next adjacent outer core layer.

3. The golf ball of claim 2 further comprising a fifth core layer and wherein the radius and the thickness (T) of the core layers follow the equation $T_A \geq 2T_B \geq 4T_C \geq 8T_D \geq 16T_E$, wherein $T_E$ is the thickness of the next adjacent outer core layer.

4. The golf ball of claim 3 further comprising a sixth core layer and wherein the radius and the thickness (T) of the core layers follow the equation $T_A \geq 2T_B \geq 4T_C \geq 8T_D \geq 16T_E \geq 32T_F$, wherein $T_F$ is the thickness of the next adjacent outer core layer.

5. The golf ball of claim 1, wherein the water vapor barrier layer is a compressed exfoliated graphite layer.

6. The golf ball of claim 1, wherein one of the core layers is a thin dense layer.

7. The golf ball of claim 1, wherein one of the core layers is a perforated spherical shell.

8. The golf ball of claim 1, wherein one of the core layers is capable of absorbing shock.

9. The golf ball of claim 1, wherein one of the core layers comprises substantially no fillers.

10. The golf ball of claim 1, wherein one of the core layers is foamed.

11. The golf ball of claim 1, wherein at least one core layer comprises polybutadiene, a crosslinking agent, a co-crosslinking agent, and a cis-to-trans catalyst.

12. The golf ball of claim 11, wherein the cis-to-trans catalyst is a halogenated organo-sulfur compound.

13. A golf ball comprising a core and a cover, wherein the core comprises at least four layers having a thickness and wherein the thickness (T) of the core layers follow the equation $T_A \geq 2T_B \geq 4T_C \geq 8T_D$, wherein $T_A$ is the radius of the innermost core, $T_B$ is the thickness of the adjacent outer core layer, $T_C$ is the thickness of the next adjacent outer core layer, and $T_D$ is the thickness of the next adjacent outer core layer, wherein the outer core layers are formed as a laminate and at least one is a water vapor barrier and wherein the core layers have progressively decreasing hardness from the innermost core layer toward the outermost layer, and wherein the hardness of the innermost core layer is at least 15 points on the Shore D scale higher than the hardness of one of the outer core layers.

14. A golf ball comprising a core and a cover, wherein the core comprises at least four layers having a thickness and wherein the thickness (T) of the core layers follow the equation $T_A \geq 2T_B \geq 4T_C \geq 8T_D$, wherein $T_A$ is the radius of the innermost core, $T_B$ is the thickness of the adjacent outer core layer and $T_C$ is the thickness of the next adjacent outer core layer, and $T_D$ is the thickness of the next adjacent outer core layer, wherein the outercore layers are formed as a laminate and at least one is a water vapor barrier and wherein the core layers have progressively increasing hardness from the innermost core layer toward the outermost layer, and wherein the hardness of the innermost core layer is at least 15 points on the Shore D scale lower than the hardness of one of the outer core layers.

15. A golf ball comprising a core and a cover, wherein the core comprises at least four layers having a thickness and wherein the thickness (T) of the core layers follow the equation $T_A \geq 2T_B \geq 4T_C \geq 8T_D$, wherein $T_A$ is the radius of the innermost core, $T_B$ is the thickness of the adjacent outer core layer and $T_C$ is the thickness of the next adjacent outer core layer, and $T_D$ is the thickness of the next adjacent outer core layer, wherein the outercore layers are formed as a laminate and at least one is a water vapor barrier and wherein the thickness of the layers that are not the innermost core is about 0.001 inches to about 0.010 inches.

16. A golf ball comprising a core and a cover, the core comprising at least three layers having a thickness and a radius, at least one of the core layers being a thin dense layer of a foamed layer, wherein the radius and thickness (T) of the core layers follow the equation $T_A \geq 2T_B \geq 4T_C$, wherein $T_A$ is the radius of the innermost core, $T_B$ is the thickness of the adjacent outer core layer and $T_C$ is the thickness of the next adjacent outer core layer and wherein the thin dense layer or foamed layer has a thickness of about 0.001 to about 0.010 inches.

* * * * *